Figure 1:
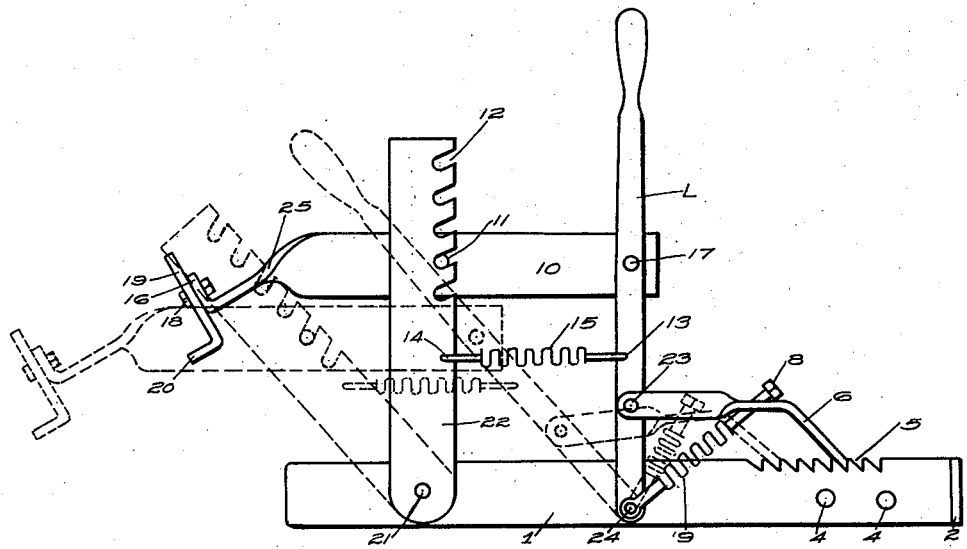

Dec. 22, 1925.

E. J. DREHER

BRAKE PEDAL HOLDING DEVICE

Filed Feb. 16, 1925

1,566,527

*INVENTOR:*
EDWARD J. DREHER

BY
*ATTORNEY.*

Patented Dec. 22, 1925.

1,566,527

UNITED STATES PATENT OFFICE.

EDWARD J. DREHER, OF LOS ANGELES, CALIFORNIA.

BRAKE-PEDAL-HOLDING DEVICE.

Application filed February 16, 1925. Serial No. 9,486.

*To all whom it may concern:*

Be it known that EDWARD J. DREHER, a citizen of the United States, residing at Los Angeles, in the county of Los Angeles and State of California, has invented new and useful Improvements in Brake-Pedal-Holding Devices, of which the following is a specification.

My invention relates to devices or a mechanism for holding one or more brakes of a motor vehicle in depressed position so that the brakes, for example, of said vehicle may be repaired or relined, thereby eliminating the services of the additional man customarily required in such an operation.

As is well-known to mechanics and those individuals who have charge of a motor vehicle repair shop, it requires two men to repair or reline the brakes of an automobile, one man being used to hold the brake pedal in depressed position while the repairs are being made by another on the other end of the vehicle. By the use of my invention the services of one of these men may be entirely dispensed with, thus eliminating the cost of his services and accordingly reducing the cost of the job.

It accordingly is an object of my invention to provide a novel form of device or mechanism for holding one of the pedals of a motor vehicle in depressed condition, or indeed to hold any movable member in such position.

A further object of my invention is to provide a device or mechanism, novel in character, which may be removably positioned on the floor boards and between the pedals and front seat of a motor vehicle, said device or mechanism having a manually operated means for adjustably holding one of said pedals in depressed position.

Another object of my invention is to provide a novel form of device or mechanism in which a pedal engaging member may be caused to hold a pedal of an automobile in depressed position by actuating the same by means of a pedal depressing member, which member may be adjustably associated with a preferably spring-held retarding member, said pedal depressing member and retarding member having associated therewith a means whereby they may be adjusted relatively to each other, a manual means being also provided whereby all of said members may be operated.

It is also within the province of my invention to provide a means for locking the brake or other pedal in depressed position, said means, if desired, taking the form of a pawl and ratchet mechanism.

It is moreover within the province of my invention to provide the retarding member associated with my novel form of device or mechanism with a set of notches or cut-away portions for engagement with at least one pin or other element positioned on the depressing member also associated with my novel mechanism, for adjustment purposes, said notches or cut-away portions being of any shape in practise found desirable.

It is, of course, to be distinctly understood that while I consider my novel form of device or mechanism as especially useful and applicable to the brake pedal of a motor vehicle, it will be clear that it will have other uses or applications than those more particularly referred to herein, and specifically described, and, if desired, may be used to depress and hold in position the clutch pedal of a motor vehicle, or indeed may be applied to any other device or used for any purpose found in practise desirable.

A still further object of my invention is to provide a novel form of device or mechanism which is simple in form, easy and inexpensive to construct, durable, thoroughly reliable, composed of a minimum number of parts, and thoroughly effective and efficient in operation.

Further objects and advantages of my invention will become more apparent as the description thereof proceeds.

Figure 3:
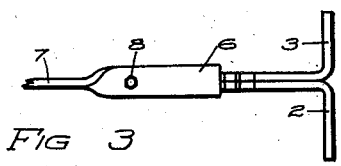
Figure 2:
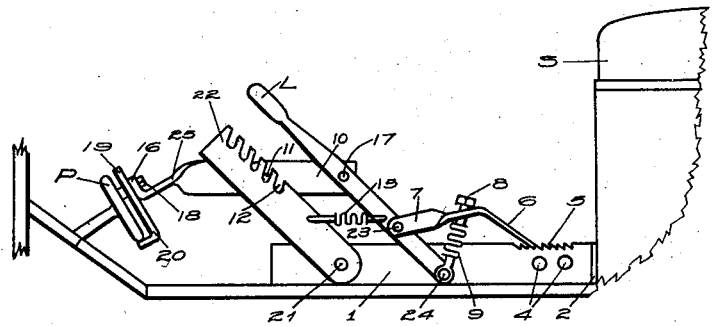

Reference is had to the accompanying drawings, in which similar reference characters denote similar parts. In the drawings, Fig. 1 is a side elevational view of my improved device or mechanism, the dotted lines showing the position the invention assumes when it is in operative position, Fig. 2 is a fragmentary elevational view of my device or apparatus in operative position when it is applied to a motor vehicle, and Fig. 3 is a fragmentary top plan view of Fig. 1.

Describing my invention more in detail, 1 indicates the base member of my device, which base member may be in the form of a flat plate, positioned as shown, with one of its edges upward. It is of course to be understood that I do not wish to be limited to the exact form of said base member, and any other preferred form may be substituted therefor. One end of said base member is bent outwardly at right angles thereto to form a flange 2, which, acting in conjunction with a similar flange 3, secured by means of bolts or other fastening means 4 to the member 1, provides a means for bracing the device or mechanism against the seat S of the motor vehicle, shown in fragmentary form in Fig. 2. Of course such a structure is suggestive merely, and any other suitable means may be substituted therefor.

Pivotally mounted on the member 1 at 21 is a vertical bar or retarding member 22, provided with a series of notches or cut-away portions 12, either inclined as shown, or substantially perpendicular to the edges of said member. If desired, also, the shape of said notches or cut-away portions may be varied so that they may be made to coact with the pin or other element 11 associated with a cross bar or pedal depressing member 10, said notches or cut-away portions being of such a configuration that said pin may not easily be disengaged therefrom.

A hand lever L, or other manual means for operating the device, is pivoted to the base member 1 at 24, and the pedal depressing member 10 is pivoted to said lever at 17. A spring 15, of any preferred form, resiliently holds the hand lever L and the retarding member 22 in substantially parallel relation, said spring being associated with said members in any desired manner.

The base member 1 is provided with a series of notches or ratchet teeth 5 adapted to be engaged by a pawl 6, which has a flattened portion 7 pivoted at 23 to the lever L. The flattened portion 7 is twisted vertically for the sake of rigidity, and also to afford a convenient means for pivoting the same to said lever. A spring 9 of any desired form, and adjustably held to the pawl 6, if preferred, by means of the bolt 8, or any other means, is secured to the pivot pin 24 on the base member 1, said spring holding the pawl 6 to the ratchet teeth 5 on said base member. It is of course to be understood that the specific means just described is suggestive merely, and that the spring 9 may be mounted in a different manner, and also that the ratchet teeth 5 may be placed on the lever L and the pawl 6 mounted on the base member 1.

The pedal depressing member 10 is twisted as indicated at 25 for the sake of rigidity, and also to provide a convenient means for associating said member with the pedal engaging member 19, the end of the member 10 being bent downwardly and then upwardly to provide a flange 16. For adjustment purposes a bolt 18 is provided so that the pedal engaging member, engaging the pedal P, may accommodate pedals of different size. It will also be noted that the pedal engaging member 19 may thus also be adjusted relatively to the pedal depressing member 10. The flange 20 of the pedal engaging member 19 coacts with the pedal P so that said pedal may be held in depressed position.

In operation, when it is desired to repair or reline the brakes of an automobile, my improved device or mechanism is positioned on the floor boards of said automobile, as shown in Fig. 2, between the pedal P and the seat S, the flanges 2 and 3 taking against said seat. By manipulating the hand lever L, which may be moved forwardly or rearwardly, to accommodate an automobile of any type or make, the pawl 6 is disengaged from the teeth 5, and the member 10 as well as the member 22 are moved forwardly or rearwardly, as the case may be, and the member 19 with its flange 20 engages said pedal, the pin 11 engaging with one of the notches 12. The spring 9 then causes the pawl to slip into one of the teeth 5, and the spring 15 holds the retarding member 22 so that the pin 11 will be securely held in one of the notches 12. The pedal engaging member 19 then securely holds the pedal P in depressed position and the brakes of the vehicle may be attended to without the aid of another man.

It will be clear that it is immaterial which pedal of the vehicle is held, it being within the province of my invention to hold also the clutch pedal in depressed position, or indeed any other movable member, my invention not being limited in its application to a motor vehicle.

To remove the device or mechanism, all that is necessary to do is to depress slightly the lever L against the action of the spring 15, which causes the pawl 6 and the pin 11 to be released, and the device may quickly be lifted out of place.

While I have described my invention with great particularity, it is clear that the same may be modified throughout a wide range. I therefore do not propose to be limited to the exact details of construction shown and described, but reserve the right in practise to make any and all modifications thereof that fall within the scope of the appended claims.

I claim as my invention:

1. In a brake pedal holding device, in combination, a base, a hand lever pivoted to said base, a spring-pressed pawl and ratchet means associated with said lever and said base, a retarding member also pivoted to said base, a cross bar pivoted to said lever, a pin on said cross bar, said retarding member being provided with means for engaging said pin, a spring associated with said lever and said retarding member, and pedal engaging means associated with said cross bar.

2. In a brake pedal holding device, in combination, a pedal depressing member, a spring-held retarding member associated therewith, manual means associated with both of said members for operating the same, and a pawl and ratchet mechanism associated with said manual means operable in a plane at right angles to said device, whereby said pedal depressing member may be held in position.

3. In a brake pedal holding device, in combination, a pedal engaging member, a pedal depressing member associated therewith, means associated with both of said members whereby they may be relatively adjusted, said means being so constructed as to cause said pedal engaging member to accommodate pedals of different size, and manual means connected with both of said members for rendering said pedal engaging member effective to hold said pedal in parallel depressed position.

4. In a brake pedal holding mechanism, in combination, a pedal engaging member, a pedal depressing member associated therewith, a retarding member adjustably associated with said pedal depressing member, a hand lever pivoted to said pedal depressing member, and a pawl and ratchet mechanism associated with said lever whereby said lever may cause said pedal depressing member to coact with said retarding member to hold said pedal in depressed position.

5. In a device of the class described, in combination, a movable member, an engaging member for holding said movable member in any desired position, a pivoted member adjustably associated with said engaging member a retarding member adjustably associated with said pivoted member, and manual means for operating said pivoted member, substantially as described.

6. In a brake pedal holding mechanism, in combination, adjustable pedal holding means, pedal depressing means associated therewith, a retarding member adjustably associated with said pedal depressing means, manual means pivoted to said pedal depressing means, a spring connecting said retarding member with said manual means, and appliances associated with said manual means whereby when said manual means is operated said pedal depressing means may be caused to actuate said pedal holding means to hold said brake pedal in position.

7. In a motor vehicle, in combination, one or more pedals associated therewith, a base member adapted to be positioned between said pedals and the seat of said vehicle, means on said base member whereby it may be braced against said seat, a pedal engaging member adapted to be brought into engagement with one of said pedals, means associated with said pedal engaging member for adjusting the same in parallel relation to said pedals, and means pivoted to said base member and associated with said pedal engaging member whereby said pedal may be held in depressed position, said means including a member resisted in its movement by a spring means.

8. In a motor vehicle, in combination, one or more pedals associated therewith, a pedal engaging member adapted to engage one of said pedals, a pedal depressing member associated with said pedal engaging member, a retarding member, said pedal depressing member and said retarding member being provided with adjustable means for adjusting the relation of said pedal depressing member to said retarding member, and means for operating said pedal depressing member.

In testimony whereof I have signed my name to this specification.

EDWARD J. DREHER.